US012069125B2

(12) United States Patent
Sodagar

(10) Patent No.: US 12,069,125 B2
(45) Date of Patent: Aug. 20, 2024

(54) METHOD FOR SWITCHING WORKFLOW OR UPDATING WORKFLOW WITH CONTINUITY AND NO INTERRUPTION IN DATAFLOW

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/704,760

(22) Filed: Mar. 25, 2022

(65) Prior Publication Data

US 2022/0337530 A1 Oct. 20, 2022

Related U.S. Application Data

(60) Provisional application No. 63/176,761, filed on Apr. 19, 2021.

(51) Int. Cl.
*H04L 41/08* (2022.01)
*H04L 67/10* (2022.01)

(52) U.S. Cl.
CPC .............. *H04L 67/10* (2013.01); *H04L 41/08* (2013.01)

(58) Field of Classification Search
CPC ...................................................... H04L 41/08
See application file for complete search history.

(56) References Cited

U.S. PATENT DOCUMENTS

| 8,682,939 | B2 | 3/2014 | McNeal et al. |
| 10,740,093 | B2 | 8/2020 | Lai et al. |
| 2014/0219295 | A1 | 8/2014 | Marshall et al. |
| 2020/0162796 | A1 | 5/2020 | Azuolas et al. |
| 2021/0004273 | A1* | 1/2021 | You ........................ G06F 9/5027 |

(Continued)

FOREIGN PATENT DOCUMENTS

| WO | 2018/049150 A1 | 3/2018 |
| WO | 2020/116896 A1 | 6/2020 |

OTHER PUBLICATIONS

ISO/IEC JTC 1/SC 29/WG 11; N19062; Coding of moving pictures and audio Convenorship: UNI (Italy); "Text of ISO/IEC FDIS 23090-8 Network-based media processing"; Jan. 2020, pp. 105.

(Continued)

*Primary Examiner* — Hua Fan
(74) *Attorney, Agent, or Firm* — Sughrue Mion, PLLC

(57) ABSTRACT

Systems and methods for managing a Network Based Media Processing (NBMP) workflow are provided. A method includes obtaining a first network based media processing (NBMP) workflow description document (WDD); creating a first workflow corresponding to the first NBMP WDD; managing at least one media processing entity (MPE) according to the first workflow; obtaining an update to the first NBMP WDD, the update comprising a second NBMP WDD, wherein the second NBMP WDD includes a continuity flag indicating that a second workflow corresponding to the second NBMP WDD is a continuation of the first workflow; creating the second workflow based on the second NBMP WDD; and in response to creating the second workflow, managing the at least one MPE according to the second workflow.

17 Claims, 5 Drawing Sheets

(56) References Cited

U.S. PATENT DOCUMENTS

2022/0053244 A1* 2/2022 Bae .................... H04L 65/40

OTHER PUBLICATIONS

International Search Report issued Jul. 6, 2022 in International Application No. PCT/US22/22106.
Written Opinion of the International Searching Authority issued Jul. 6, 2022 in International Application No. PCT/US22/22106.
Office Action issued Nov. 13, 2023 in Japanese Application No. 2022-563074.
Chinese Office Action dated Feb. 8, 2024 in Chinese Application No. 202280003940.9.

* cited by examiner

METHOD FOR SWITCHING WORKFLOW OR UPDATING WORKFLOW WITH CONTINUITY AND NO INTERRUPTION IN DATAFLOW

CROSS-REFERENCE TO THE RELATED APPLICATIONS

This application claims priority from U.S. Provisional Application No. 63/176,761, filed on Apr. 19, 2021, the disclosure of which is incorporated herein by reference in its entirety.

FIELD

Embodiments of the present disclosure are directed to Moving Picture Experts Group (MPEG) Network Based Media Processing (NBMP) and, more particularly, to managing an NBMP workflow.

BACKGROUND

MPEG Network Based Media Processing (NBMP) project has developed a concept of processing media on cloud. The NBMP Draft International Specification shows a great potential to increase media processing efficiency, faster and lower-cost deployment of media services, and the ability to provide large scale deployment by leveraging the public, private or hybrid cloud services.

However, while the NBMP current specification allows updating a workflow, it does not define whether the flow of data needs to be continued, or whether no data should be missed during the update.

SUMMARY

In embodiments, a method performed by at least one processor of a workflow manager of a media system includes obtaining a first network based media processing (NBMP) workflow description document (WDD); creating a first workflow corresponding to the first NBMP WDD; managing at least one media processing entity (MPE) according to the first workflow; obtaining an update to the first NBMP WDD, the update comprising a second NBMP WDD, wherein the second NBMP WDD includes a continuity flag indicating that a second workflow corresponding to the second NBMP WDD is a continuation of the first workflow; creating the second workflow based on the second NBMP WDD; and in response to creating the second workflow, managing the at least one MPE according to the second workflow.

In embodiments, a workflow manager of a media system includes at least one memory storing program code; and at least one processor configured to read the program code and operate as instructed by the program code, the program code including: first obtaining code configured to cause the at least one processor to obtain a first network based media processing (NBMP) workflow description document (WDD); first creating code configured to cause the at least one processor to create a first workflow corresponding to the first NBMP WDD; first managing code configured to cause the at least one processor to manage at least one media processing entity (MPE) according to the first workflow; second obtaining code configured to cause the at least one processor to obtain an update to the first NBMP WDD, the update comprising a second NBMP WDD, wherein the second NBMP WDD includes a continuity flag indicating that a second workflow corresponding to the second NBMP WDD is a continuation of the first workflow; second creating code configured to cause the at least one processor to create the second workflow based on the second NBMP WDD; and second managing code configured to cause the at least one processor to, in response to creating the second workflow, manage the at least one MPE according to the second workflow.

In embodiments, a non-transitory computer-readable medium stores computer code that is configured to, when executed by at least one processor that implements a workflow manager of a media system, cause the at least one processor to: obtain a first network based media processing (NBMP) workflow description document (WDD); create a first workflow corresponding to the first NBMP WDD; manage at least one media processing entity (MPE) according to the first workflow; obtain an update to the first NBMP WDD, the update comprising a second NBMP WDD, wherein the second NBMP WDD includes a continuity flag indicating that a second workflow corresponding to the second NBMP WDD is a continuation of the first workflow; create the second workflow based on the second NBMP WDD; and in response to creating the second workflow, manage the at least one MPE according to the second workflow.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
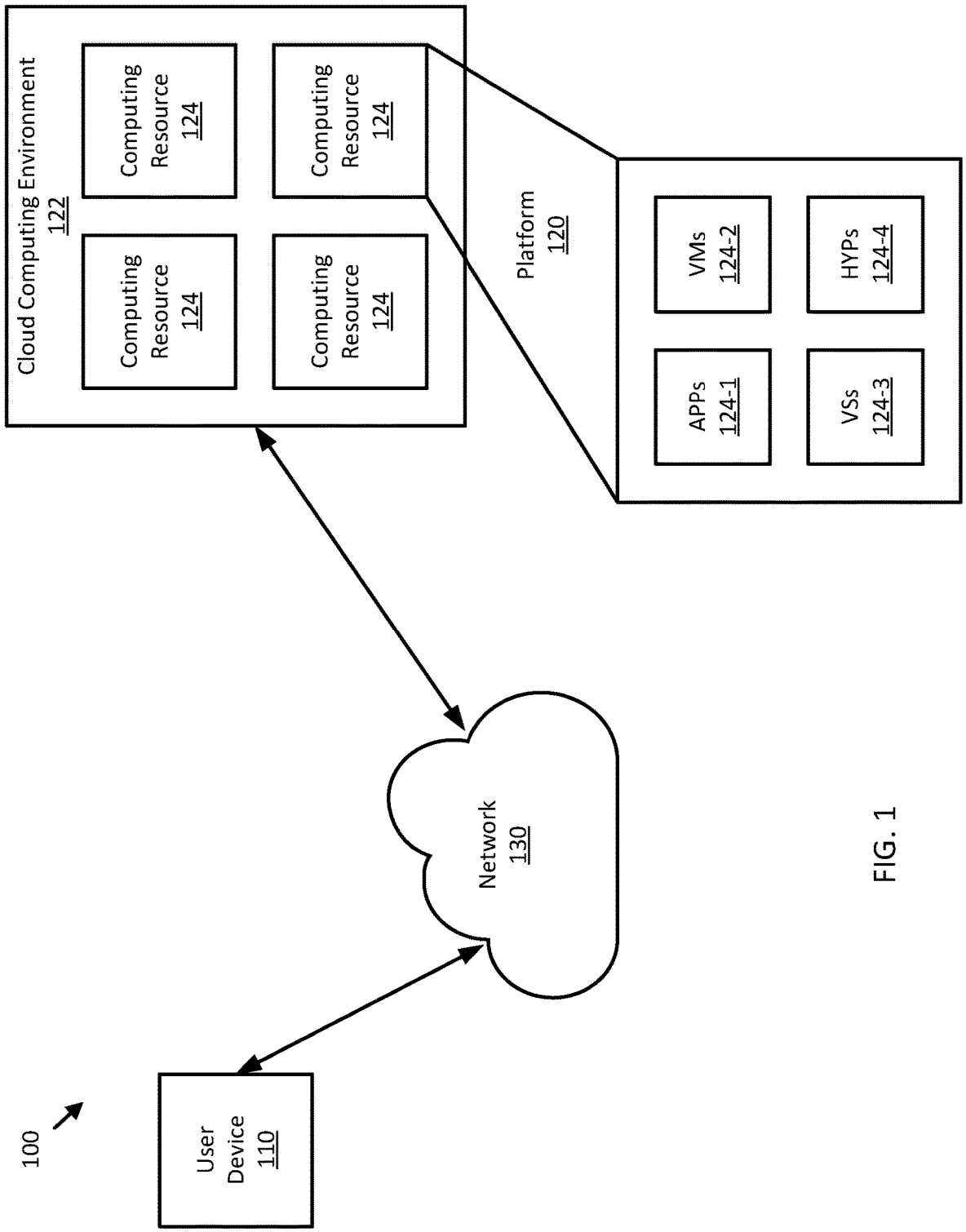
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
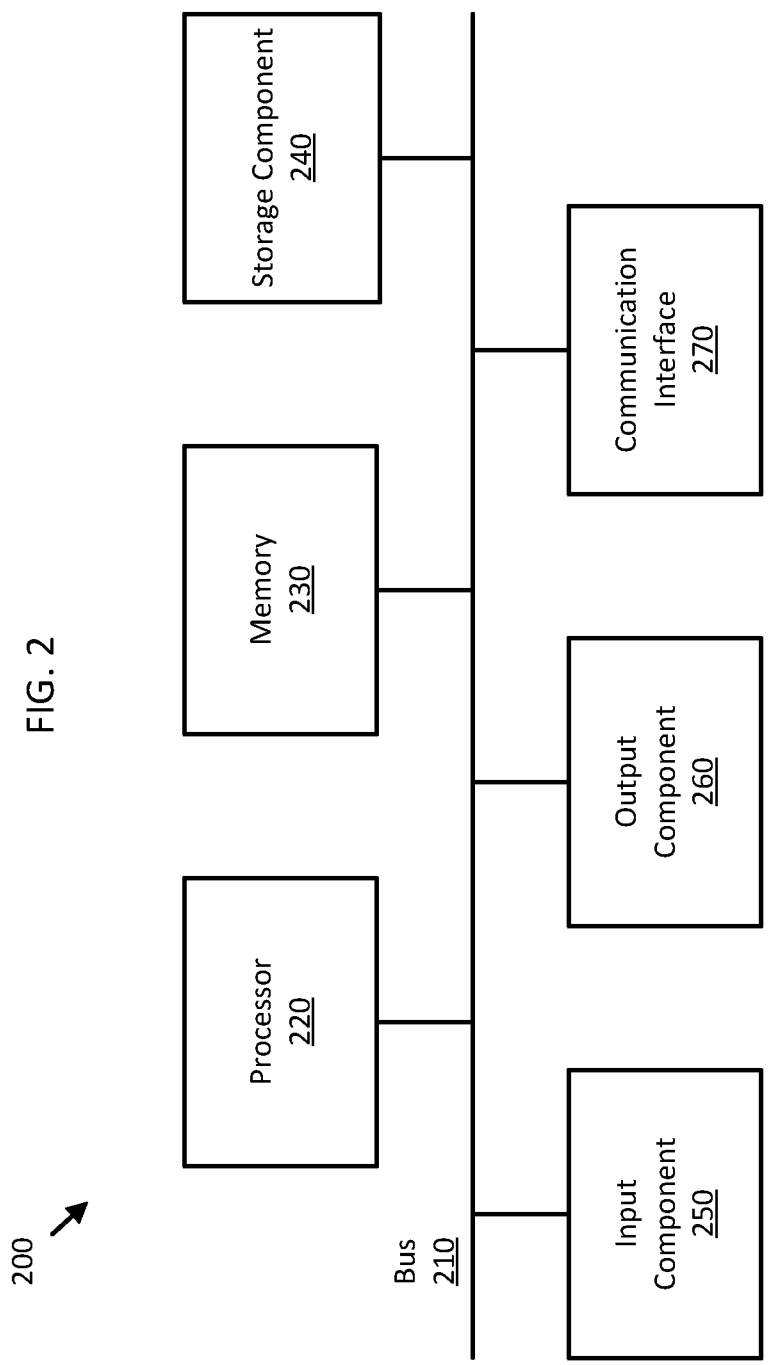
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein, Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
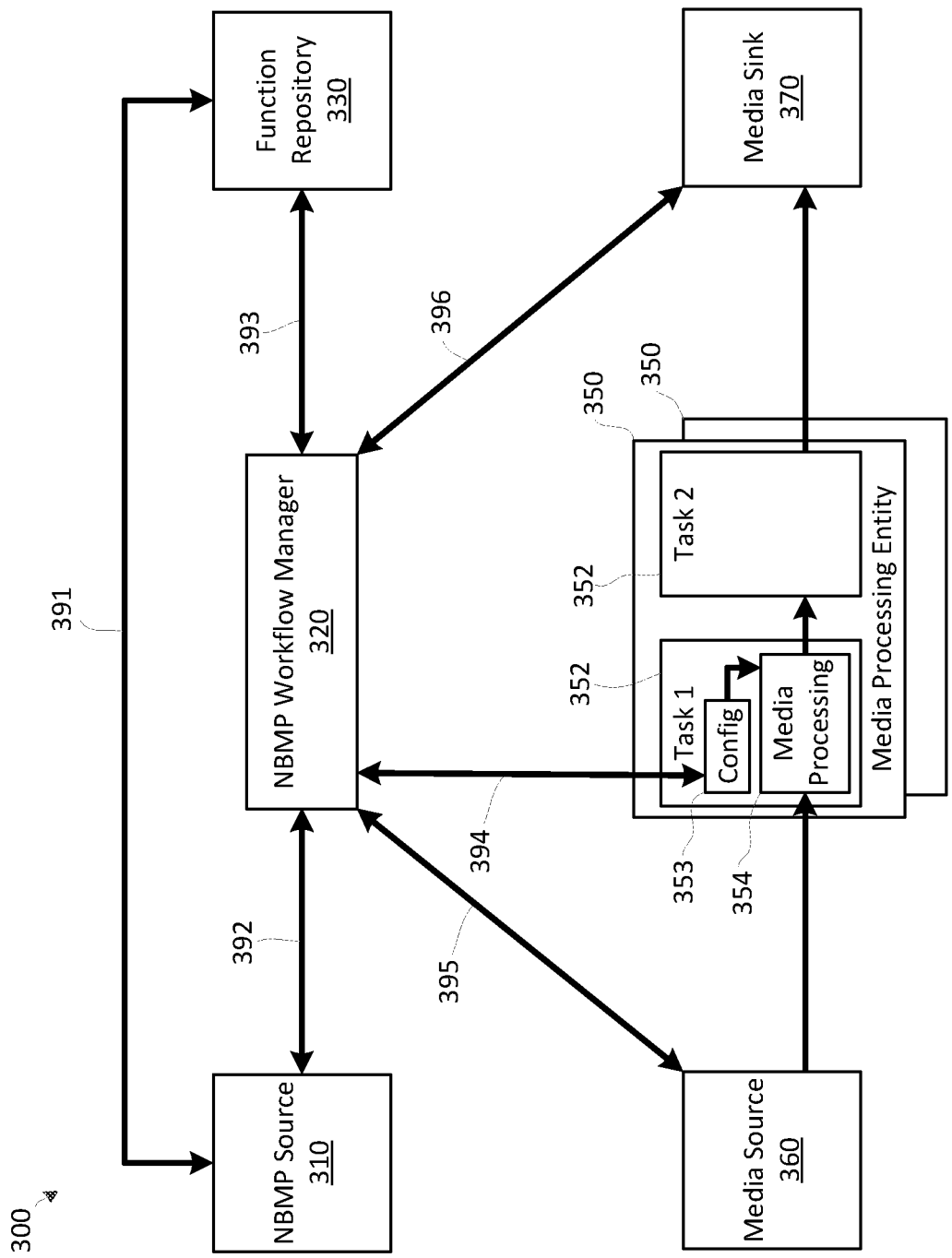
FIG. 3 is a block diagram of an NBMP system according to embodiments

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity, may communicate with the NBMP workflow manager 320 via an NBMP workflow application programming interface (API) 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310 the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394

(e.g. an NBMP task API). The NBMP workflow manager 320 may comprise or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In an embodiment, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In embodiments, communication between any of the components of the NBMP system 300 using an API may include several descriptors, each of which may have several parameters.

Embodiments may provide a method for seamless switching or updating of cloud workflows during running without any interruption in data flow or missing any data. Accordingly, embodiments may add seamless continuity features to the NBMP specification.

During an NBMP-related process, a workflow may have been working for an extended period of time. Due to an increase in the volume of data, one or more tasks of the workflow may need to be split to cope with the load increase. In this case, it may be desirable that no data is lost due to switching to the new workflow.

In some deployments, the current tasks can be re-used. So there the current tasks can be used in the updated workflow. In some applications, switching to a new workflow may need to happen at an exact time, for example for data collection or billing purposes.

The NBMP workflow API for updating workflow in the current NBMP specification does not have any notion of continuity, which means that the NBMP Workflow Manager can stop the current workflow, update the workflow with the new one and start again and data may be lost during this update.

Embodiments may add a continuity flag to the General Descriptor, as shown for example in Table 1 and Table 2 below. In the case of continuity=true, the NBMP Workflow manager may switch between the two workflows without losing any data. Furthermore, the switching time may be requested to be a certain time. For example, it may be useful to know the exact time of switching for reports.

TABLE 1

General Descriptor

| Parameter Name | Type | Cardinality |
| --- | --- | --- |
| id | P | 1 |
| name | P | 1 |
| description | P | 1 |
| rank | P | 0-1 |
| mpeg-compatibility | P | 0-1 |
| published-time | P | 0-1 |
| priority | P | 0-1 |
| execution-time | P | 0-1 |
| input-ports | Array of object | 1 |
| output-ports | Array of object | 1 |
| is-group | P | 0-1 |
| continuity | P | 0-1 |
| switching_time | P | 0-1 |
| state | P | 1 |

TABLE 2

General parameters

| Name | Definition | Unit | Type | Valid range |
| --- | --- | --- | --- | --- |
| id | unique string in the scope of Repository/Workflow of the resource | N/A | string | N/A |
| name | name for identifying the resource | N/A | string | N/A |
| description | a human-readable description for the resource | N/A | string | N/A |
| rank | The rank of Function/Function Group | N/A | number | unsigned integer |

TABLE 2-continued

General parameters

| Name | Definition | Unit | Type | Valid range |
|---|---|---|---|---|
| mpeg-compatibility | among Functions with the same functionality. A higher number means a higher rank. URN indicating the compatibility with a reference Function/ Function Group defined in Annex A and B. | URI | string | N/A |
| published-time | date and time of publication of this resource | As defined by RFC3339, section 5.6 | string | N/A |
| priority | priority information for the resource | N/A | number | unsigned integer |
| port-name | unique string among all port-names of this resource defining the logic name for input or output | N/A | string | N/A |
| is-group | value 'true' indicates containing Descriptor describes a Function Group or Task Workflow. If the value is 'true', a connection-map object may exist in this Description. The default value is 'false'. | N/A | boolean | N/A |
| continuity | Value 'true' indicates that this workflow update is a continuation of the previous workflow and no data may be lost during switching. The default value is 'false'. | N/A | boolean | N/A |
| switching_time | Switching time of the workflow to its update. If this value is in the past, then the switch should happen immediately and is updated with the exact switching time. If a lossless transition can not occur at this time, then the switch should happen at the first possible time and is updated with the exact switching time. The value is ignored is 'continuity' is 'false'. | As defined by RFC3339, section 5.6 | string | N/A |
| state | current state of the resource in its lifecycle The value of this parameter may be one of the following in a NBMP Operation's response: null instantiated idle running in-error destroyed If this parameter is included in a request from the NBMP Source or Workflow Manager, the value of this parameter may be one of the following: instantiated idle | | string | N/A |

In tables herein, additions to the NBMP specification according to embodiments may be indicated by italics.

In embodiments, the two new parameters may be used with Workflow Update or Task Update.

In some cases, running a completely parallel workflow requires a large amount of of resources, and the Cloud platform may prefer to maintain some of the tasks in the running workflow during the update.

Because the NBMP Client provides the new WDD, the Workflow Manager may identify the difference between the running workflow and the new WDD.

The NBMP Client can assist in this task by providing the following information:

1. The list of tasks that are changed.
2. The list of connections that are changed.

Because each task has an identifier (id) in the WDD, changing a task, for example by removing and replacing it with a new task, or introducing the new task may be easily achieved:

1. Every existing task has an id in the running workflow.
2. The location of a task in the running workflow is identified with the value of 'instance' in the connection map.
3. Any new task in the workflow update doesn't have 'instance' set.

Considering the above, it may be easy for the NBMP Workflow Manager to identify which tasks/function instances in the updated workflow are new and which ones are the old ones.

As for providing the list of connections, each workflow may be defined by an array of connection-map objects. The workflow manager may compare each object in this array from the workflow update to the running workflow and identify the new or updated connection-map objects. However, to simplify the process, in embodiments an id may be added to each connection-map object:

TABLE 3

Connection-Map Array Element

| Name | Description | Type | Cardinality |
|---|---|---|---|
| connection-id | a unique identifier of this connection map. During a WDD update, any connection-map element which has the identical connection-id to the existing WDD, is considered the same and requires no update. If the WDD update is continuous (using the 'continuity' flag), this connection may remain working with no interruption in its data flow. | P | 1 |
| from | specifies Task/Function's id and port names from which the connection is | O | 1 |
| to | specifies Task/Function's id and port names to which the connection is | O | 1 |
| flowcontrol-parameters | contains flow control parameters for the connection. | O | 0-1 |

TABLE 3-continued

Connection-Map Array Element

| Name | Description | Type | Cardinality |
|---|---|---|---|
| co-located | The elements of this objects may be described using flowcontrol-requirements. Specifies the deployment of the 2 connected tasks. When the value is True, the 2 tasks may be deployed into the same MPE, Otherwise, the deployment is determined by the Workflow Manager based on available resources. The default is 'false'. | P | 0-1 |
| other-parameters | contains any other properties or parameters defined for the DAG edge, e.g. references to the Requirement Descriptor. The elements of this objects may be described using generic parameter representation of subclause 9.20.1.1 | O | 0-1 |

TABLE 4

Processing Parameters

| Name | Definition | Unit | Type | Valid range |
|---|---|---|---|---|
| keywords | list of keywords that can be used to execute a search in the Function Repository | N/A | array of string | N/A |
| start-time | resource's start time | As defined by RFC3339, section 5.6 | string | N/A |
| is-dynamic | flag indicating whether the image is static or dynamic. A value of 'true' indicates the image is built dynamically. The default value is 'false' (static image). | N/A | boolean | N/A |
| url | pointer to the resource implementation, according to IETF RFC3986 | N/A | string | N/A |
| os | operation system | N/A | string | N/A |
| version | version number of operation system | N/A | string | N/A |
| architecture | hardware architecture | N/A | string | N/A |
| environment | environment | N/A | string | N/A |
| patch-url | URL (according to IETF RFC3986) defining the patching scheme for this image | N/A | string | N/A |
| scheme | URL (according to IETF RFC3986) defining information object scheme or information needed for dynamic build | N/A | string | N/A |
| connection-id | a unique string among all connection-map's ids in a workflow and its updates. | NA | string | N/A |
| co-located | Specifies the deployment of the 2 connected tasks. When the value is True, the 2 tasks may be deployed into the same MPE, Otherwise, the deployment is determined by the Workflow Manager based on available resources. | N/A | boolean | N/A |

TABLE 4-continued

Processing Parameters

| Name | Definition | Unit | Type | Valid range |
|---|---|---|---|---|
| id | The default is 'false'. specifies Function's id | N/A | string | N/A |
| instance | specifies identifier for one Instance of a Function. An Instance of a Function may have unique restrictions in a Function Group. This identifier may be unique for each Instance in the same Function Group. Note: If a Function is used more than once in one Function Group with identical restrictions, these restrictions can be defined by one Instance of that Function. | N/A | string | N/A |
| port-name | specifies Function's logic port name | N/A | string | N/A |

As discussed above, in tables herein, additions to the NBMP specification according to embodiments may be indicated by italics.

Accordingly, embodiments may provide a method for signaling the seamless continuity of workflow operation during a workflow update, wherein no data is lost during the update, wherein the switching time is defined, and wherein in the case the requested switching time is not possible, the actual switching time is provided in the response.

Embodiments may relate to a method for signaling the old and new connection in a workflow update, where each connection has a unique identifier, so that if an old connection disappears for the update, it means it is not valid anymore, and the id of a new connection appearing in the workflow update indicates it is a new connection, and the connections with the same id are considered identical and no change is required.

Embodiments may relate to a method of using any of the methods described herein together to update a part of a workflow, without replacing all tasks or connections, and maintaining continuity in the data flow at the input and output of the workflow without loss of any data.

Figure 4:
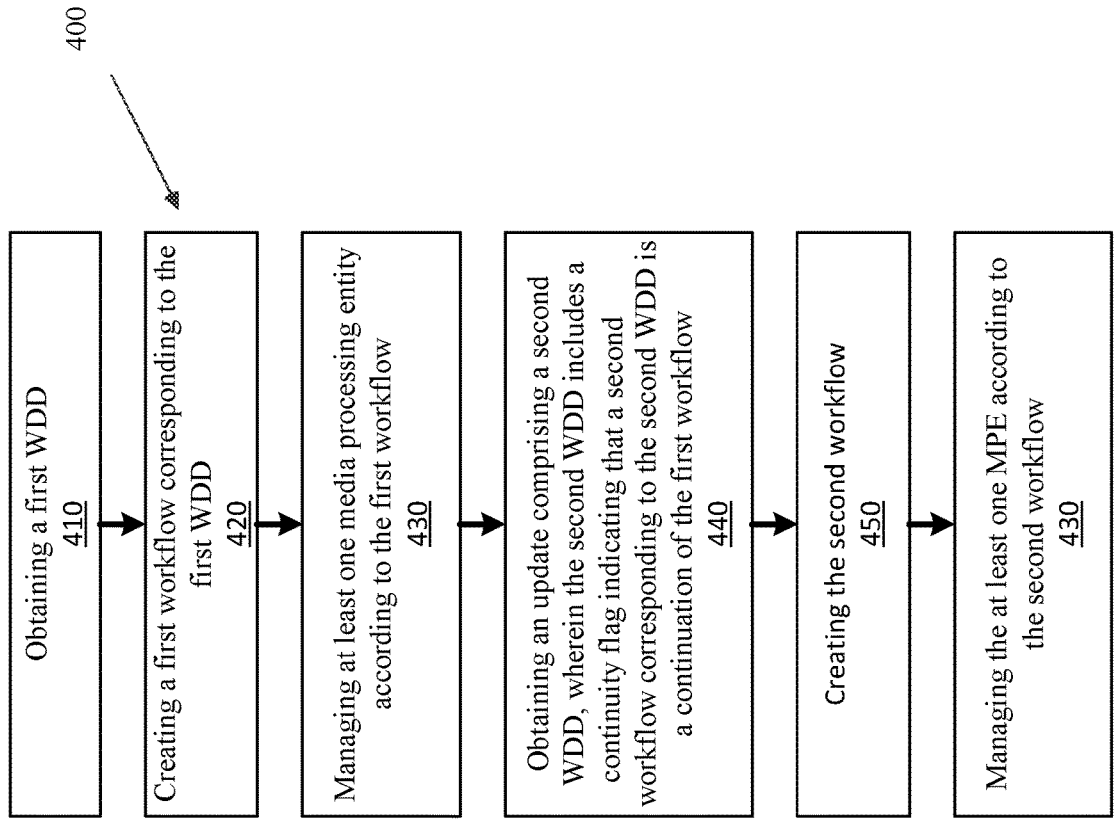
FIG. 4 is a block diagram of an example of a workflow management process according to embodiments.

With reference to FIGS. 3 and 4, a process 400 performed by the NBMP workflow manager 320 is described below.

FIG. 4 is a flowchart is a flowchart of an example process 400.

As shown in FIG. 4, process 400 may include obtaining a first network based media processing (NBMP) workflow description document (WDD) (block 410).

As further shown in FIG. 4, process 400 may include creating a first workflow corresponding to the first NBMP WDD (block 420).

As further shown in FIG. 4, process 400 may include managing at least one media processing entity (MPE) according to the first workflow (block 430).

As further shown in FIG. 4, process 400 may include obtaining an update to the first NBMP WDD, the update comprising a second NBMP WDD, wherein the second NBMP WDD includes a continuity flag indicating that a second workflow corresponding to the second NBMP WDD is a continuation of the first workflow (block 440).

As further shown in FIG. 4, process 400 may include creating the second workflow based on the second NBMP WDD (block 450).

As further shown in FIG. 4, process 400 may include, in response to creating the second workflow, managing the at least one MPE according to the second workflow (block 460).

In embodiments, based on the continuity flag indicating that the second workflow is the continuation of the first workflow, all data corresponding to the managing of the at least one MPE according to the first workflow may be maintained during the managing of the at least one MPE according to the second workflow.

In embodiments, the second NBMP WDD may further include a syntax element indicating a time for switching from the managing of the at least one MPE according to the first workflow to the managing of the at least one MPE according to the second workflow.

In embodiments, update may be one from among a workflow update and a task update.

In embodiments, a task of the first workflow may be represented by a first connection-map object in the first NBMP WDD, wherein the first connection-map object specifies a location of the task in a connection map corresponding to the first workflow, and at least one connection to another element in the first workflow, and wherein the first connection-map object includes a connection identifier which identifies the task.

In embodiments, based on the connection identifier being included in a second connection-map object in the second NBMP WDD, the task may be maintained in the second workflow.

In embodiments, based on the continuity flag indicating that the second workflow is the continuation of the first workflow, all data corresponding to execution of the task in the first workflow may be maintained in the second workflow.

Although FIG. 4 shows example blocks of process 400, in some implementations, process 800 may include additional blocks, fewer blocks, different blocks, or differently arranged blocks than those depicted in FIG. 4. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

According to embodiments of the present disclosure, at least one processor with memory storing computer code or program code may be provided. The computer code may be configured to, when executed by the at least one processor, perform any number of aspects of the present disclosure.

Figure 5:
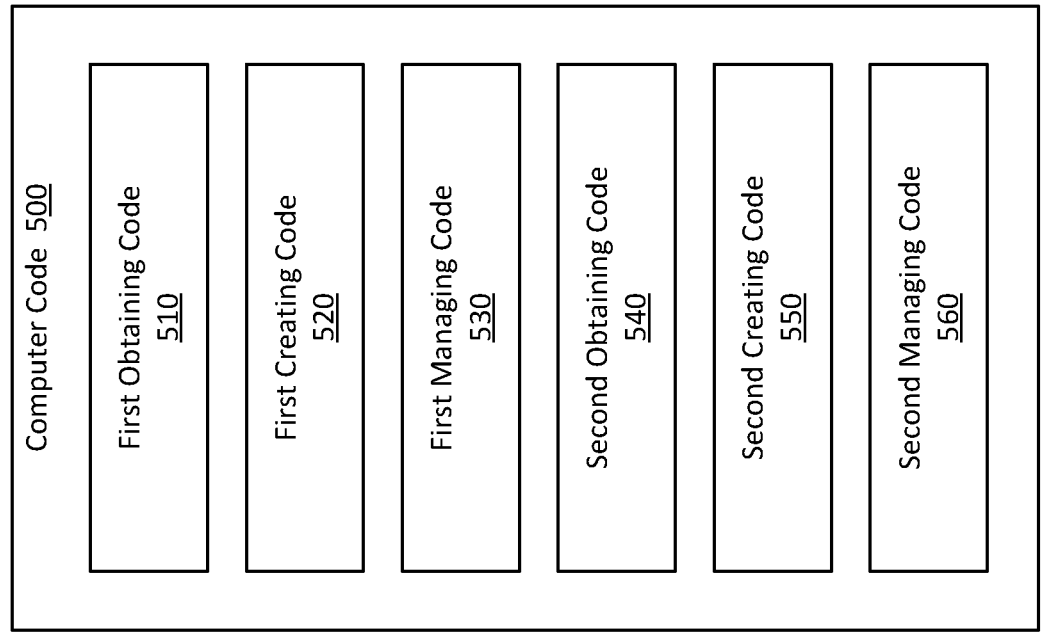
FIG. 5 is a block diagram of an example of computer code according to embodiments.

For example, with reference to FIG. 5, computer code 500 may be implemented in the NBMP system 300. For example, the computer code may be stored in memory of the NBMP workflow manager 320 and may be executed by at least one processor of the NBMP workflow manager 320. The computer code may include, for example, first obtaining code 510, first deriving code 520, first managing code 530, second obtaining code 540, second deriving code 550, and second managing code 560.

In embodiments, the first obtaining code 510, first deriving code 520, first managing code 530, second obtaining code 540, second deriving code 550, and second managing code 560 may be configured to cause the NBMP workflow manager 320 to perform the aspects of the process described above with reference to FIG. 4, respectively.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor of a workflow manager of a media system, the method comprising:
   obtaining a first network based media processing (NBMP) workflow description document (WDD);
   creating a first workflow corresponding to the first NBMP WDD;
   managing at least one media processing entity (MPE) according to the first workflow;
   obtaining an update to the first NBMP WDD, the update comprising a second NBMP WDD, wherein the second NBMP WDD includes (i) a continuity flag indicating that a second workflow corresponding to the second NBMP WDD is a continuation of the first workflow, (ii) a first syntax element corresponding to an execution time of the first workflow, and (iii) a second syntax element corresponding to a switching time that specifies a predetermined time for stopping the first workflow and switching from the managing of the at least one MPE according to the first workflow to the managing of the at least one MPE according to the second workflow, wherein the first syntax element is different from the second syntax element;
   creating the second workflow based on the second NBMP WDD; and in response to creating the second workflow, managing the at least one MPE according to the second workflow,
wherein based on a determination the predetermined time specified by the switching time is in the past, the first workflow is stopped at a time of the determination and switched to the second workflow.

2. The method of claim 1, wherein based on the continuity flag indicating that the second workflow is the continuation of the first workflow, all data corresponding to the managing of the at least one MPE according to the first workflow is maintained during the managing of the at least one MPE according to the second workflow.

3. The method of claim 1, wherein the update is one from among a workflow update and a task update.

4. The method of claim 1, wherein a task of the first workflow is represented by a first connection-map object in the first NBMP WDD,
wherein the first connection-map object specifies a location of the task in a connection map corresponding to the first workflow, and at least one connection to another element in the first workflow, and
wherein the first connection-map object includes a connection identifier which identifies the task.

5. The method of claim 4, wherein based on the connection identifier being included in a second connection-map object in the second NBMP WDD, the task is maintained in the second workflow.

6. The method of claim 5, wherein based on the continuity flag indicating that the second workflow is the continuation of the first workflow, all data corresponding to execution of the task in the first workflow is maintained in the second workflow.

7. A workflow manager of a media system, the workflow manager comprising:
at least one memory storing program code; and
at least one processor configured to read the program code and operate as instructed by the program code, the program code including:
first obtaining code configured to cause the at least one processor to obtain a first network based media processing (NBMP) workflow description document (WDD);
first creating code configured to cause the at least one processor to create a first workflow corresponding to the first NBMP WDD;
first managing code configured to cause the at least one processor to manage at least one media processing entity (MPE) according to the first workflow;
second obtaining code configured to cause the at least one processor to obtain an update to the first NBMP WDD, the update comprising a second NBMP WDD, wherein the second NBMP WDD includes (i) a continuity flag indicating that a second workflow corresponding to the second NBMP WDD is a continuation of the first workflow, (ii) a first syntax element corresponding to an execution time of the first workflow, and (iii) a second syntax element corresponding to a switching time that specifies a predetermined time for stopping the first workflow and switching from the managing of the at least one MPE according to the first workflow to the managing of the at least one MPE according to the second workflow, wherein the first syntax element is different from the second syntax element;
second creating code configured to cause the at least one processor to create the second workflow based on the second NBMP WDD; and
second managing code configured to cause the at least one processor to, in response to creating the second workflow, manage the at least one MPE according to the second workflow,
wherein based on a determination the predetermined time specified by the switching time is in the past, the first workflow is stopped at a time of the determination and switched to the second workflow.

8. The workflow manager of claim 7, wherein based on the continuity flag indicating that the second workflow is the continuation of the first workflow, all data corresponding to the managing of the at least one MPE according to the first workflow is maintained during the managing of the at least one MPE according to the second workflow.

9. The workflow manager of claim 7, wherein the update is one from among a workflow update and a task update.

10. The workflow manager of claim 7, wherein a task of the first workflow is represented by a first connection-map object in the first NBMP WDD,
wherein the first connection-map object specifies a location of the task in a connection map corresponding to the first workflow, and at least one connection to another element in the first workflow, and
wherein the first connection-map object includes a connection identifier which identifies the task.

11. The workflow manager of claim 10, wherein based on the connection identifier being included in a second connection-map object in the second NBMP WDD, the task is maintained in the second workflow.

12. The workflow manager of claim 11, wherein based on the continuity flag indicating that the second workflow is the continuation of the first workflow, all data corresponding to execution of the task in the first workflow is maintained in the second workflow.

13. A non-transitory computer-readable medium storing computer code that is configured to, when executed by at least one processor that implements a workflow manager of a media system, cause the at least one processor to:
obtaining a first network based media processing (NBMP) workflow description document (WDD);
creating a first workflow corresponding to the first NBMP WDD;
managing at least one media processing entity (MPE) according to the first workflow;
obtaining an update to the first NBMP WDD, the update comprising a second NBMP WDD, wherein the second NBMP WDD includes (i) a continuity flag indicating that a second workflow corresponding to the second NBMP WDD is a continuation of the first workflow, (ii) a first syntax element corresponding to an execution time of the first workflow, and (iii) a second syntax element corresponding to a switching time that that specifies a predetermined time for stopping the first workflow and switching from the managing of the at least one MPE according to the first workflow to the managing of the at least one MPE according to the second workflow, wherein the first syntax element is different from the second syntax element;
creating the second workflow based on the second NBMP WDD; and
in response to creating the second workflow, managing the at least one MPE according to the second workflow,
wherein based on a determination the predetermined time specified by the switching time is in the past, the first workflow is stopped at a time of the determination and switched to the second workflow.

14. The non-transitory computer-readable medium of claim 13, wherein based on the continuity flag indicating that the second workflow is the continuation of the first workflow, all data corresponding to the managing of the at least one MPE according to the first workflow is maintained during the managing of the at least one MPE according to the second workflow.

15. The non-transitory computer-readable medium of claim 13, wherein the update is one from among a workflow update and a task update.

16. The non-transitory computer-readable medium of claim 13, wherein a task of the first workflow is represented by a first connection-map object in the first NBMP WDD,
   wherein the first connection-map object specifies a location of the task in a connection map corresponding to the first workflow, and at least one connection to another element in the first workflow, and
   wherein the first connection-map object includes a connection identifier which identifies the task.

17. The non-transitory computer-readable medium of claim 16, wherein based on the connection identifier being included in a second connection-map object in the second NBMP WDD, the task is maintained in the second workflow, and
   wherein based on the continuity flag indicating that the second workflow is the continuation of the first workflow, all data corresponding to execution of the task in the first workflow is maintained in the second workflow.

* * * * *